METHOD OF FORMING A MAGNETIC RECORDING MEDIUM

Filed Aug. 31, 1967

INVENTOR.
CHARLES A. SIMMONS
BY Ronald C. Shipman
AGENT 3,516,860
Patented June 23, 1970

3,516,860

METHOD OF FORMING A MAGNETIC RECORDING MEDIUM

Charles A. Simmons, Liverpool, N.Y., assignor to The Singer Company, a corporation of New Jersey Filed Aug. 31, 1967, Ser. No. 664,835
Int. Cl. G11b 5/72
U.S. Cl. 117—236 2 Claims

ABSTRACT OF THE DISCLOSURE

A magnetic recording disk having a glass substrate, a bonding layer, a magnetizable thin film, and an abrasion resistant coating. Each layer is deposited on the glass substrate by a vapor deposition method carried out in vacuum.

BACKGROUND, FIELD OF INVENTION

This invention pertains to a method of forming a magnetic recording medium, and in particular concerns a method of forming a magnetic recording disk so as to have a thin, magnetizable film of uniform thickness or decreasing thickness in the radially outward direction.

BACKGROUND, PRIOR ART

Magnetic recording disks well-known in the prior art generally include a relatively stiff disk shaped base member or substrate. A thin film of magnetizable material is deposited on one or both smooth flat surfaces of the disk. Reliable and efficient magnetic recording disks must utilize a magnetizable film having a relatively high coercivity characteristic ($H_c$).

In the past, in order to form magnetic recording disks it was necessary to utilize extremely smooth substrate surfaces onto which the high coercivity material would firmly adhere.

Until the present invention, it was not possible to deposit reliably a high coercivity magnetizable thin film metallic material on a substrate by vapor deposition methods. In particular, it was not possible to securely adhere a magnetizable thin film to the naturally smooth flat surface of a glass disk substrate. As the thickness of a thin metallic film increases, high tensile stresses in the film are encountered. Such internal stresses have been found to be sufficiently high to pull the film free of the glass surface, and even strip glass from the substrate surface.

Further, it has long been known in the art to which the present invention pertains, that the gain in signal strength of signals read from a magnetic disk are generally higher near the outer periphery of the disk than near the axis or radially inner portion of the disk. It has been found that signal strength depends among other things upon the thickness of the magnetic thin film.

SUMMARY OF THE INVENTION

One preferred embodiment of the present invention is accomplished by vapor depositing a thin film of chromium on a very smooth clean surface of a glass substrate, vapor depositing a thin film of cobalt-silver alloy, which is magnetizable and, if desired, vapor depositing a wear-resistant thin film of rhodium on top of the magnetizable thin film.

Controlled angle of incidence of the metal alloy vapors on to the substrate surface will result in a magnetic disk having a varying thickness of magnetic material.

It is, therefore, an object of the present invention to provide a novel method for making a magnetic recording medium.

The features of novelty that are considered characteristic of this invention are set forth with particularity in the appended claims. The organization and method of operation of the invention may best be understood from the following description when read in connection with the accompanying drawing.

DESCRIPTION OF A PREFERRED EMBODIMENT

Figure 1:
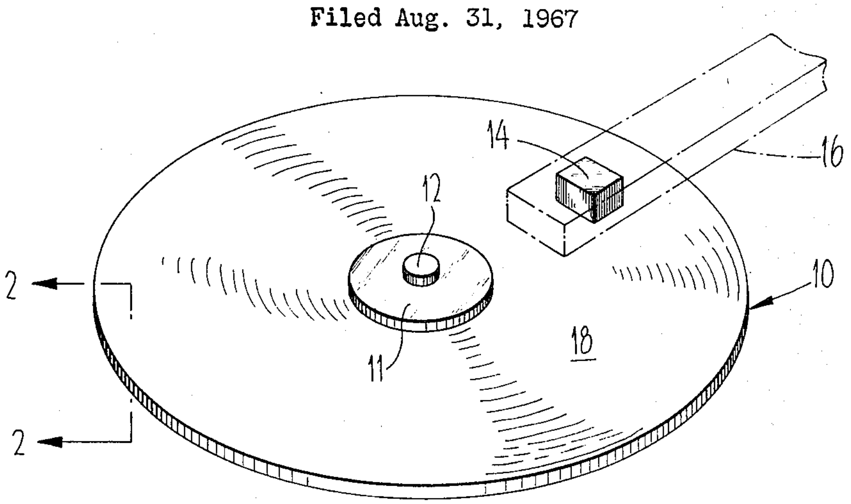
FIG. 1 is a perspective of a magnetic recording built according to the present invention.

In FIG. 1 there is shown a magnetic recording disk 10 mounted on a hub 11 which is secured to a shaft or spindle 12 for rotation about the axis of the shaft. In operation an electromagnetic transducer or read/write head 14 suitably mounted on an arm or frame 16 is held against or in very close proximity with the upper surface 18 of the disk. As will be understood by those skilled in the art, a transducer positioning mechanism (not shown) is usually provided to selectively position the mounting arm and transducer at various locations radially from the center of the disk for reading or writing information from or onto the disk. In order to provide for efficient, reliable recording and readout of information or data between the transducer and disk it is necessary that the surface of the disk be as flat and smooth as possible and that the magnetizable material of the disk have as high a magnetic coercive characteristic as possible.

Figure 2:
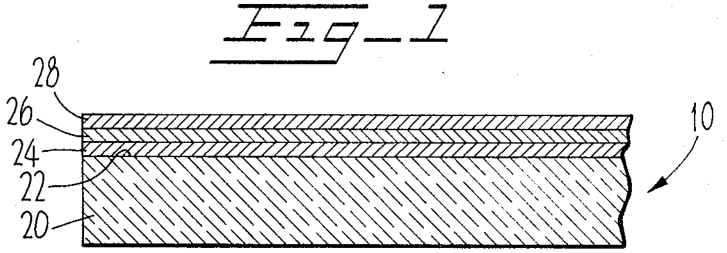
FIG. 2 is an enlarged partial cross-sectional view along the lines 2—2 of FIG. 1 and illustrates the construction of a magnetic recording disk built according to the present invention.

As illustrated clearly in FIG. 2, the disk 10 comprises a base member or substrate means 20 having at least one very flat and smooth surface 22. It has been found that glass is an excellent material for use as the substrate since it is easily manufactured with a flat smooth surface.

A thin film or layer of an intermediate bonding means or agent 24 is deposited on the substrate surface 22. The bonding means is a material that makes better adhesive or bonding contact with the glass disk than does the usual magnetic material 26 with the bare disk. Of course, if the magnetic material 26 has the ability to bond well with the substrate material the intermediate bonding agent may be eliminated.

On top of the bonding agent 24 there is deposited a thin film or layer of magnetizable material 26. This material has the required high coercive characteristics required of a good magnetic disk recording medium. In one embodiment, as described more fully below, the magnetizable material was an alloy of cobalt and silver.

On top of the magnetizable material 26 there is deposited a thin film or layer of a wear-resistant material 28. The wear-resistant material is provided to protect the magnetic material 26 from abrasion by the transducer 14 during operation of the disk 10. A good wear resistant material which has been found to be suitable in the practice of this invention is rhodium.

The novel method of making the magnetic recording disk according to the present invention will now be described in detail. A disk-shaped substrate 20 having at least one substantially flat smooth surface 22 may be formed with a central opening for mounting in the vapor depositing apparatus 30 of FIG. 3, and for mounting to an operating hub 11 of FIG. 1. Other means for mounting the substrate may be utilized as desired, such as, for example, by bonding to a hub-like fixture.

The flat surface 22 is prepared by thorough cleansing. This is preferably performed by first scrubbing with a nonabrasive household-type cleanser using a soft material such as a diaper cloth. The cleanser is then removed by thoroughly rinsing with tap water while scrubbing with a clean soft diaper material. Finally, the disk is rinsed twice with de-ionized water. It is suggested that a holding fixture be used to prevent handling of the disk with the fingers during the de-ionized water rinses.

Next the disk is thoroughly dried by mounting it in a heating oven at a temperature of somewhat greater than 100° C. and in which filtered air is circulated.

Figure 3:
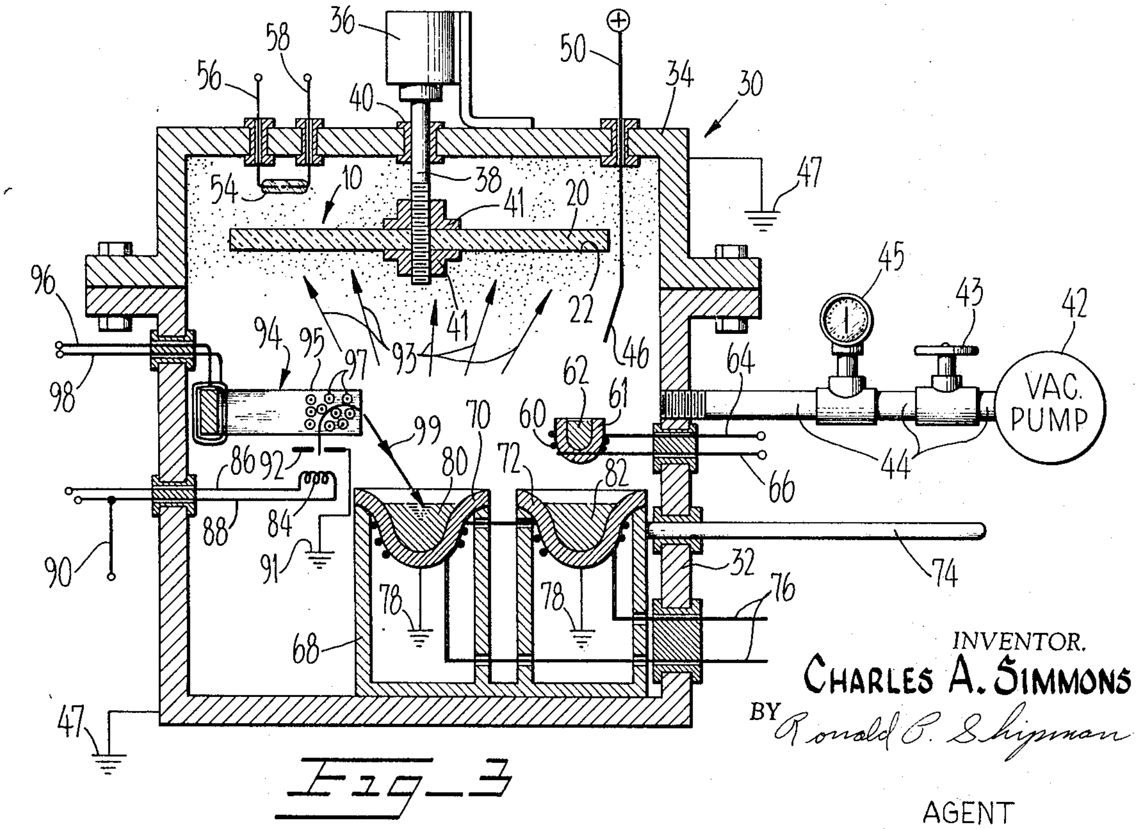
FIG. 3 is a simplified cross-sectional view of an apparatus utilized in accomplishing the present invention.

The dry disk 20 is then mounted in a vapor depositing apparatus 30, such as shown schematically in FIG. 3. In FIG. 3, there is shown a tank 32 having a removable cover 34 which may be releasably sealed together in fluid tight relationship as will be understood by those skilled in the art. The tank and its cover are each electrically connected to ground potential as indicated by the ground symbols 47.

A means for rotating the disk 20 during the vapor deposition process is provided by an electric motor and speed reducing unit 36 mounted on the top of the cover 34. A shaft 38 extends from the unit 36 inwardly of the cover through a suitably formed hole and sealing arrangement 40.

The disk 20 is then mounted on the lower end of the shaft 38 with the clean flat surface 22 facing downwardly. As shown in FIG. 3, the shaft 38 protrudes through a central hole in the disk and a set of caps 41 threadedly engaged with the shaft retain the disk in horizontal position.

The cover 34, with the glass disk 20 mounted on the shaft 38 as just described, is then releasably sealed to the top of the tank. The air pressure in the tank is then lowered to a pressure value of about 40 micro torr by means of a vacuum pump 42 and associated ducts 44, valves 43 and gauge 45 suitably communicating with the interior of the tank.

The disk 20 is then caused to slowly rotate at a speed of about 18 revolutions per minute. While the disk is revolving, an ionizing current is passed through the rarefied atmosphere inside the sealed tank by means of an electrode 46 and the ground connections 47. Positive potential is supplied to the first electrode 46 by means of a lead 50 which passes through the wall of the tank by any suitable sealing means and is connected to a suitable direct current power supply (not shown). The electrical potential across the electrode 46 to ground is preferably on the order of about 2.5 kilovolts with a current of about 80 milliamperes passing through the rarefied or low pressure air in the tank. This passage of current is maintained for about ten minutes in order to deionize the remaining air in the tank.

The internal air pressure within the tank is then further reduced to about $10^{-5}$ torr. Electrical potential is then removed from the electrode 46. A radiant energy heating element 54 disposed above the disk 20 is energized by means of suitable electrical leads 56 and 58 which pass through the tank's wall via suitable sealing means and attached to output terminals of a suitable direct or alternating current power supply (not shown). The heating element 54 will increase the temperature of the disk so as to further aid removal of gases from the disk. The electrical power to the heating element 54 should be applied in a controlled manner so that the rate of temperature increase of the disk 20 is no greater than about 10° C. per minute; this slow temperature rise is to assure that the glass disk does not break by too rapid thermal stresses. The temperature of the disk should be stabilized at a value no less than about 325° C., such temperature should be maintained for disk bakeout purposes for no less than 30 minutes.

During the bakeout phase or step, as set forth above, the internal pressure of the tank is further reduced to at least about $5\times10^{-6}$ torr and maintained at such pressure until the end of the process.

The thin film of chromium 24 (as shown in FIG. 2) is now deposited on the bare flat surface 22 of the disk 20. A heating element 60 extends outwardly from the wall of the tank and is formed in a shape wherein a small ceramic cup 61 is held therein. Inside the cup there is initially disposed a quantity of solid chromium 62. Electrical power is then applied to the heating element by means of leads 64 and 66 which pass through the tank wall through suitable sealing means and are connected to direct or alternating current power supply (not shown). The heat from the element 60 causes sublimation of the chromium. Since the pressure inside the tank is very low, molecules of chromium travel readily throughout the interior of the tank; the subliming chromium in effect generates a vapor of chromium which is very hot. As the chromium vapor impinges on the surface 22 of the disk, which surface, of course, is substantially cooler than the liquid chromium, the molecules collect and solidify thereon. This step is carried on until a chromium layer or thin film of about 250 angstroms thickness is deposited. Electrical power to the heating element 60 is then turned off.

The thin film of magnetizable material 26 (as shown in FIG. 2) is now deposited on the chromium layer 24. A frame 68 rests on the bottom of the tank. A series of upstanding members support two electrically conductive metal carrying means or boats 70 and 72, one boat on one side of the frame and the other boat on the other side of the frame. As shown in FIG. 3, the left-hand boat 70 is disposed substantially in line with the axis of rotation of the disk 20. A means for sliding the frame 68 so that either of the boats may be disposed directly in line with the axis of the disk is provided by an operating arm 74 attached to one side of the frame and extending through the wall of the tank through suitable sealing means. Manual operation of the outer end of the arm will enable the second boat to be disposed in line with the axis of the disk.

Each boat 70 and 72 is comprised of an electrically conductive material such as, for example, copper and is connected to ground potential as shown by ground symbols 78. A mass 80 of the magnetizable material is contained within the boat 70 while a mass 82 of abrasion resistant material is contained within the other boat 72. A water carrying cooling tube 76 is in contact with and coiled about the lower surface of each boat 70 and 72 and extends outwardly through the wall of the tank. A flow of water is established through the tube 76 by connection to a suitable source and drain (not shown) for cooling the boats 70 and 72 during the step of melting the metallic masses 80 and 82 now to be described in further detail.

A heated cathode 84 is mounted by suitable means within the tank at a location laterally offset from and just slightly above the top of boat 70 as shown in FIG. 3. Power for heating the cathode is furnished by means of leads 86 and 88 which pass through suitable sealing means in the wall of the tank and are connected to a suitable source of electrical current. Also, attached to one of the cathode heater current leads 88 is a lead 90 which is connected to a suitable negative potential source of direct current power. In a typical embodiment of the present invention lead 90 has applied thereto a potential of minus 6,000 volts D.C. An anode 92 having a small central aperture is disposed above the cathode and is electrically connected to ground potential as indicated by ground symbol 91. Electrons thermionically emitted from cathode 84 are attracted to the anode 92. A small stream or pencil of electrons pass inwardly through the anode's central opening.

In order to direct the narrow stream of electrons into the boat 70, a magnetic field is formed at a location just above the anode by means of an electromagnet 94. Power for the electromagnet is furnished by leads 96 and 98 which pass through suitable sealing means in the tank wall and are connected to a suitable direct current power supply (not shown). It will be clear that when the magnetic field at the ends or pole pieces 95 of the electromagnet is directed upwardly of the plane of the paper, or arrow points as indicated by dots 97, electrons passing upwards through the anode's central opening will be caused to travel in a clockwise direction and then will be directed downward into the mass 80 contained within the boat 70. The path of such electrons is indicated by arrowed line 99. The electrons will flow through the mass 80, through the boat 70 and thence back to the power supply via the electrical lead to which ground symbol 76 is attached.

The electron flow through the mass 80 will cause a small central portion near the top of the mass to heat up to the melting point and thus liquefy. The cooling water through the tube 76 will keep the remainder of the mass below the liquefying temperature. The molecules of the liquid will readily leave the surface of the liquefied mass and travel upwardly toward the disk as illustrated by arrows 93. The molecules, collectively considered a vapor, impinge upon the thin chromium film 24 previously deposited on the clean surface of the disk, and solidify thereon. It is to be noted that the metallic molecules are emitted from the boat 70 in a fanned out or ray-like pattern much like the emission of light from a point source. Therefore, it can be readily understood that the amount of magnetic material deposited per unit area of the disk surface at any point on the disk will vary in proportion to the cosine of the angle between the vertical axis of the disk (as shown in FIG. 3) and a straight line extending from a point located on said axis at about the center of the boat 70 to such point on the disk. In other words, the amount of material deposited near the center of the disk will be greater than the amount of material deposited near the perimeter of the disk. There will thus be deposited on the chromium adhesion layer or thin film 24 a thin film of magnetizable material 26, the thickness of which decreases in the direction radially outwardly of the disk; the advantage of such a varying thickness magnetizable material thin film has been described previously.

One typical magnetizable material utilized in the process of the present invention is an alloy of about 96.5% cobalt by weight and about 3.5% silver by weight. Other magnetizable materials may be utilized as desired.

The thickness of the magnetizable thin film 26 may be as desired. In one embodiment of the present invention the film 26 was of an average thickness of about 25,400 angstrom units.

After the magnetizable material 26 is vapor deposited as heretofore described, the boat 72 is positioned directly in line with the axis of the disk 20 by pushing the control rod 74 to the left. The wear resistance material 82 in the boat 72 will be melted and the vapors deposited on the magnetic film 26 of the disk in the same manner as described above for vapor depositing the magnetizable film 26. In one embodiment of the present invention, the wear resistance material was rhodium. The thickness of the rhodium material may be as desired. It has been found that a rhodium film 28 of a thickness in the range of from about 2,500 angstroms to about 3,000 angstroms proves satisfactory.

After depositing the layers of material as heretofore described, the electrical power to the cathode is turned off, and the electrical power to the heater element 54 is turned off. The disk 20 is allowed to cool to a temperature not greater than 100° C. at which time atmospheric pressure may then be introduced into the tank. The cover 34 may then be removed and the disk 20 may be taken off the shaft 38. It has been found that polishing the layer 28 of rhodium removes any slight deviations from flatness in the metallic layers that might have occurred during the layer depositing process, and also cold works the layer 26 of magnetizable material so as to substantially improve the hysteresis loop squareness characteristic and thus provide substantially larger signal outputs during operation.

What is claimed is:

1. The method of producing a magnetic record disk, said method comprising the steps of:

providing a disk-shaped glass member with a substantially flat smooth surface;

providing a substantially reduced pressure environment for said disk;

heat said disk to a temperature in excess of about 325° C.;

deposit a layer of chromium on said surface by vapor deposition;

deposit a layer of cobalt-silver alloy on said layer of chromium by vapor deposition;

deposit a layer of rhodium on said cobalt-silver alloy layer by vapor deposition.

2. The method according to claim 1 wherein there is further included the step of: cold working said layer of cobalt-silver alloy by polishing said layer of rhodium.

References Cited

UNITED STATES PATENTS

| | | | |
|---|---|---|---|
| 2,853,402 | 9/1958 | Blois | 117—239 |
| 2,900,282 | 8/1959 | Rubens | 117—227 |
| 3,109,749 | 11/1963 | Ricco | 117—239 |
| 3,161,946 | 12/1964 | Birkenbeil | 117—240 X |
| 3,192,892 | 7/1965 | Hanson et al. | 117—240 X |
| 3,375,091 | 3/1968 | Feltkeller | 117—240 X |
| 3,378,394 | 4/1968 | David. | |

OTHER REFERENCES

Bertelsen; Journal of Applied Physics, vol. 33, No. 6, June 1962, pp. 2026 to 2030 relied upon.

ANDREW G. GOLIAN, Primary Examiner

U.S. Cl. X.R.

117—107, 107.1, 237, 239, 240